United States Patent [19]

Janke et al.

[11] Patent Number: 5,440,695

[45] Date of Patent: Aug. 8, 1995

[54] INPUT/OUTPUT MODULE HAVING A COMBINATION INPUT/OUTPUT POINT

[75] Inventors: Donald R. Janke, Milwaukee; Richard R. Sabroff, Lake Mills, both of Wis.

[73] Assignee: AEG Schneider Automation, Inc., North Andover, Mass.

[21] Appl. No.: 214,040

[22] Filed: Mar. 16, 1994

Related U.S. Application Data

[63] Continuation of Ser. No. 931,669, Aug. 19, 1992, abandoned, which is a continuation of Ser. No. 769,513, Oct. 1, 1991, abandoned, which is a continuation of Ser. No. 409,926, Sep. 20, 1989, abandoned.

[51] Int. Cl.⁶ .............................................. G06F 13/00
[52] U.S. Cl. .................... 364/141; 364/DIG. 2; 364/921; 364/921.4; 364/921.5; 364/921.6; 364/921.8; 364/921.9; 364/926.93; 364/927.81; 364/927.92; 364/927.98; 364/927.99; 364/929.2; 364/929.4; 364/929.5; 364/935; 364/935.2; 364/935.3; 364/935.4; 364/935.44; 364/935.5; 364/935.7; 364/944.5; 364/944.9; 364/945.7; 364/945.9; 364/948.4; 364/948.5; 364/949; 364/949.2; 364/130

[58] Field of Search ................ 395/275, 700; 364/921, 364/921.4, 921.5, 921.6, 921.8, 921.9, 926.93, 927.81, 927.92, 927.98, 927.99, 927.2, 929.4, 929.5, 935, 935.2, 935.4, 935.44, 935.5, 935.7, 935.3, 944.5, 944.9, 945.7, 945.9, 948.4, 948.5, 949, 949.2

[56] References Cited

U.S. PATENT DOCUMENTS

| 4,504,927 | 3/1985 | Callan | 364/900 |
| 4,593,380 | 6/1986 | Kocher et al. | 364/900 |
| 4,872,136 | 10/1989 | Cieri et al. | 364/900 |
| 4,951,250 | 8/1990 | Cruickshank et al. | 364/900 |

FOREIGN PATENT DOCUMENTS 3522586 6/1985 Germany.

Primary Examiner—Thomas M. Heckler
Assistant Examiner—Jonathan Hall Backenstose
Attorney, Agent, or Firm—Ware, Fressola, Van Der Sluys & Adolphson

[57] ABSTRACT

A combination input/output (I/O) module for a microprocessor based device is disclosed. The combination I/O module includes a combination point which is operable as either an input point adapted for coupling to an input device, an output point adapted for coupling to an output device, or both. The combination I/O module provides continuous sensing of the presence or absence of the output device. The combination I/O module includes a triac and provides for continuous sensing of the conductive state of the triac.

11 Claims, 6 Drawing Sheets

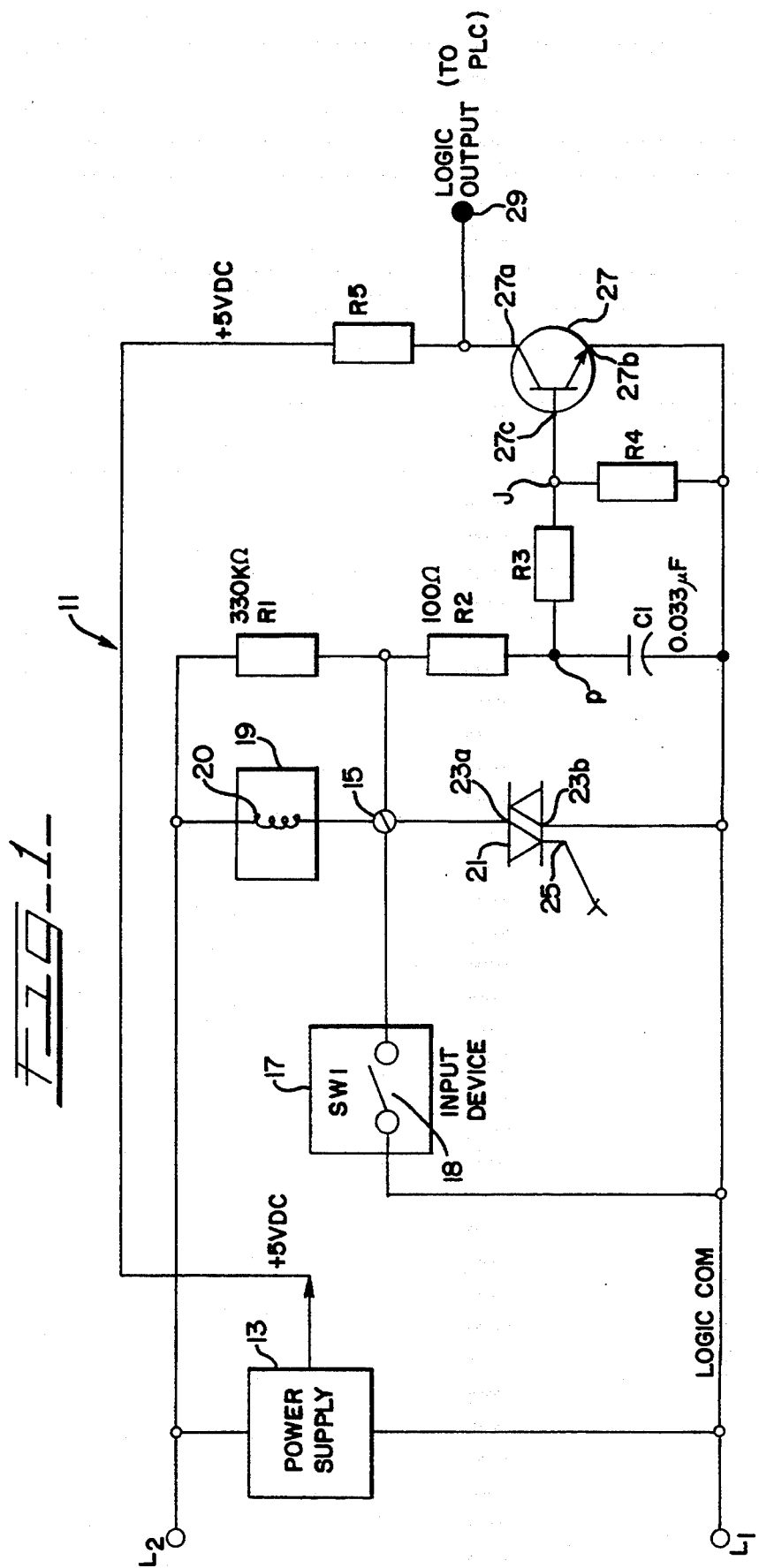

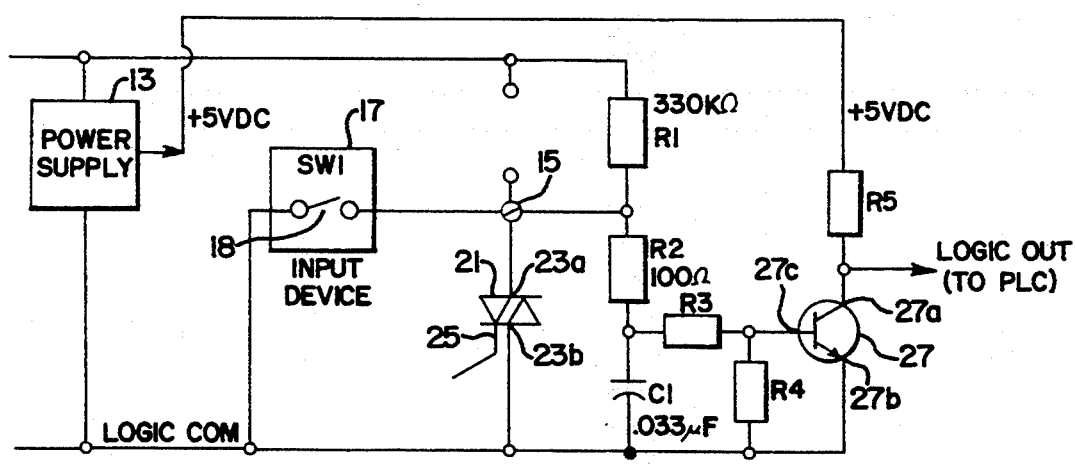
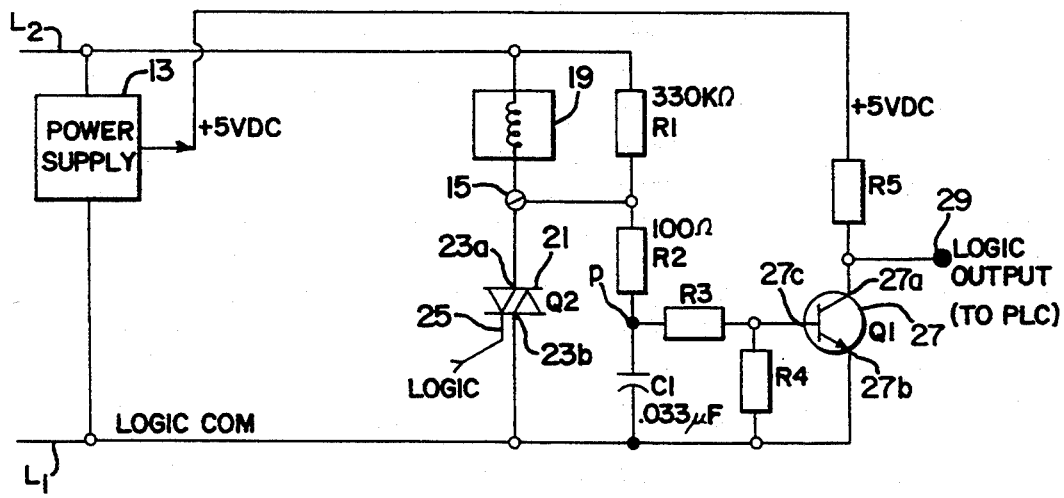

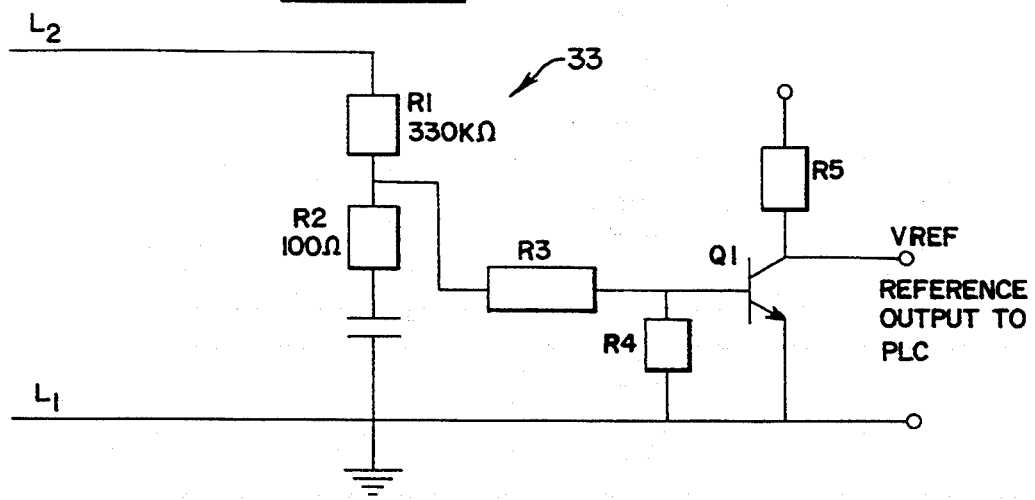
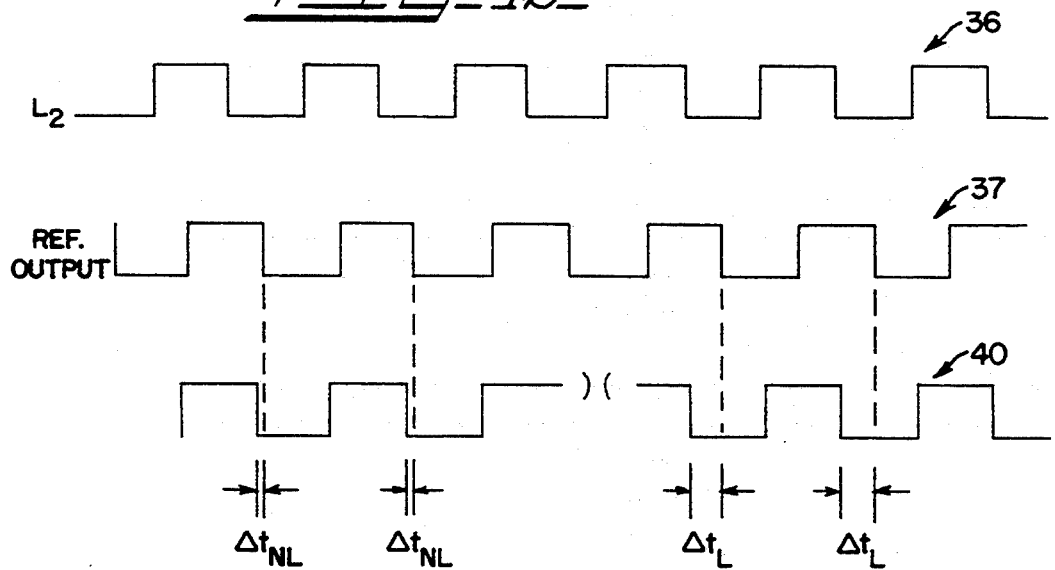

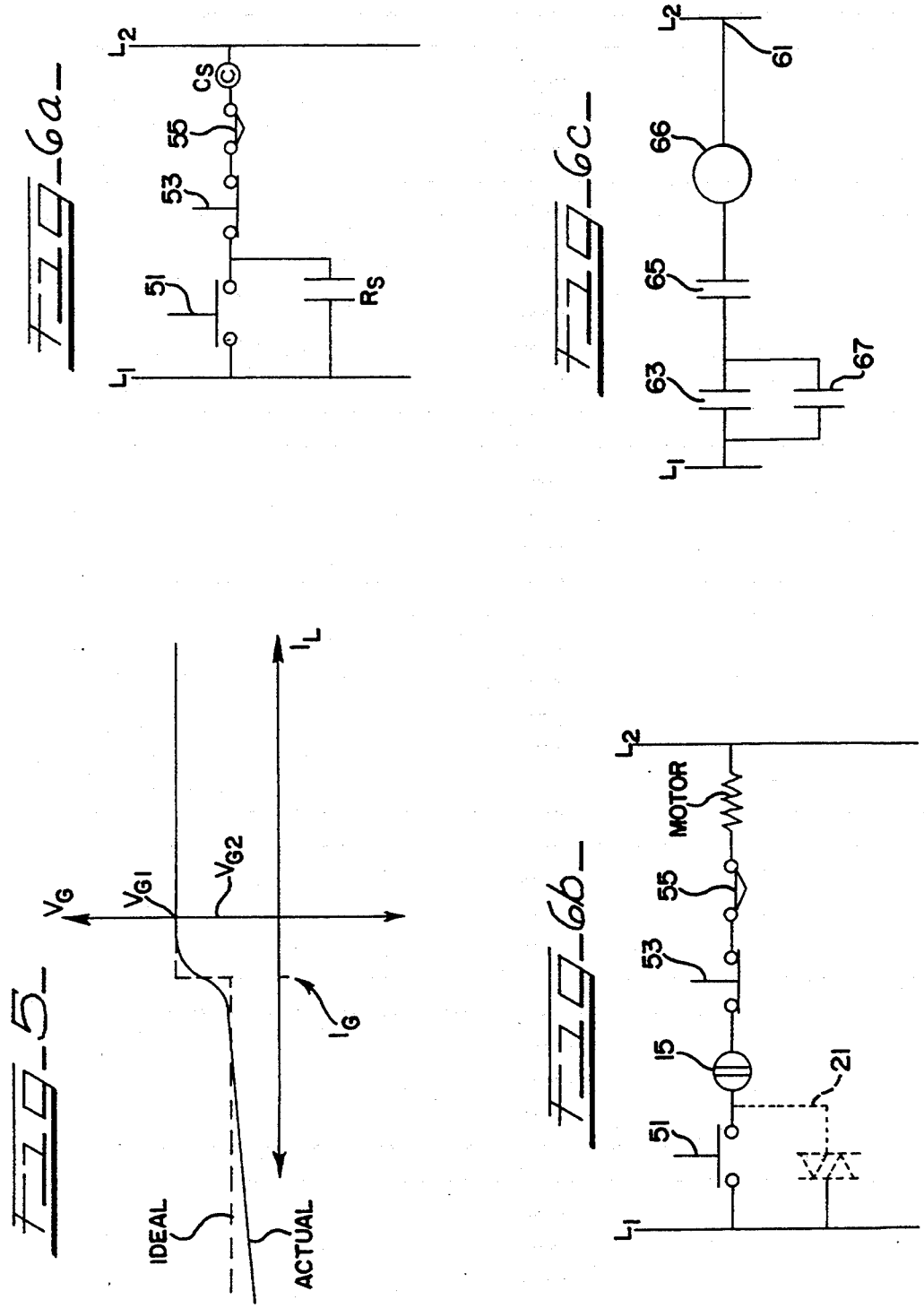

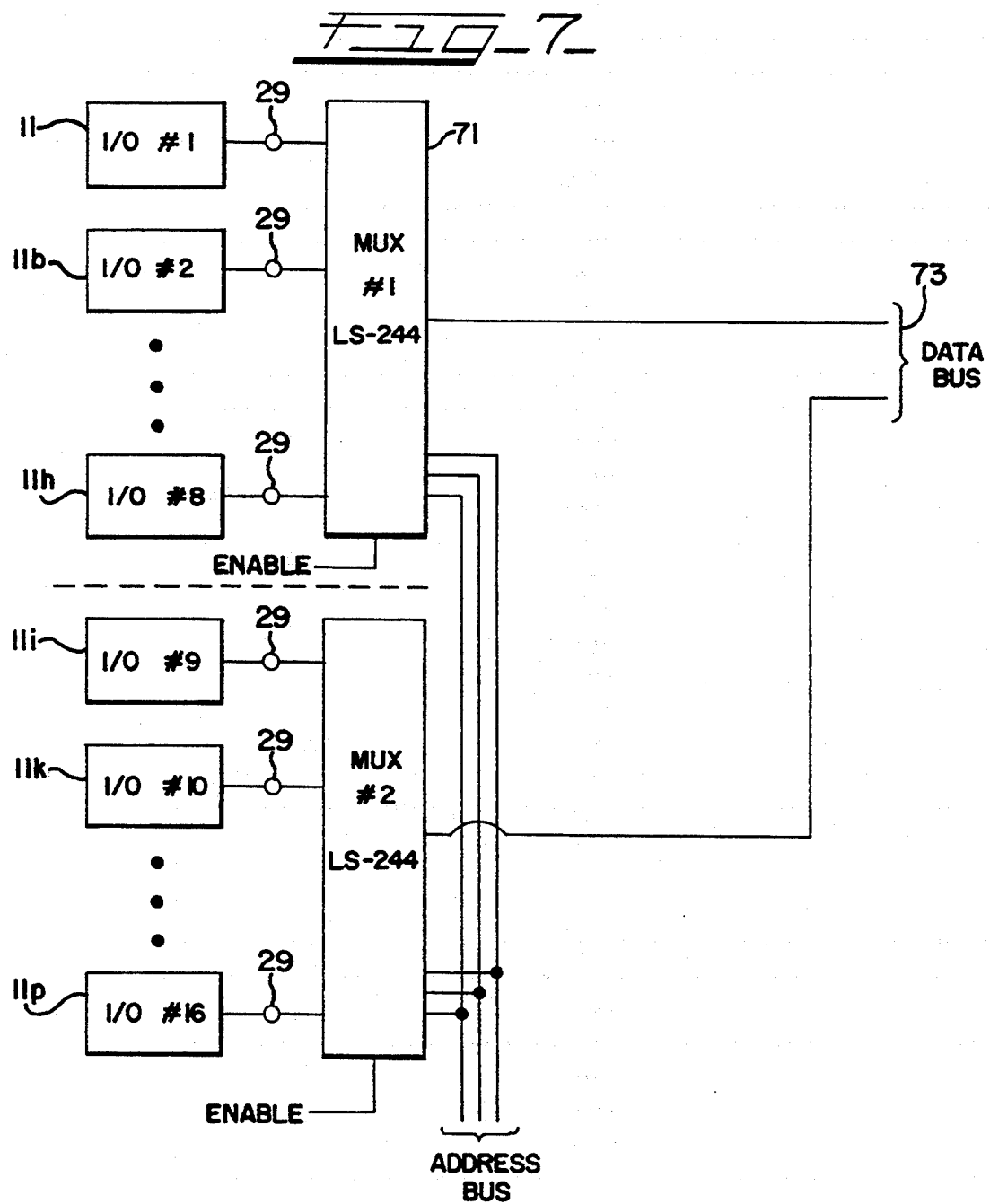

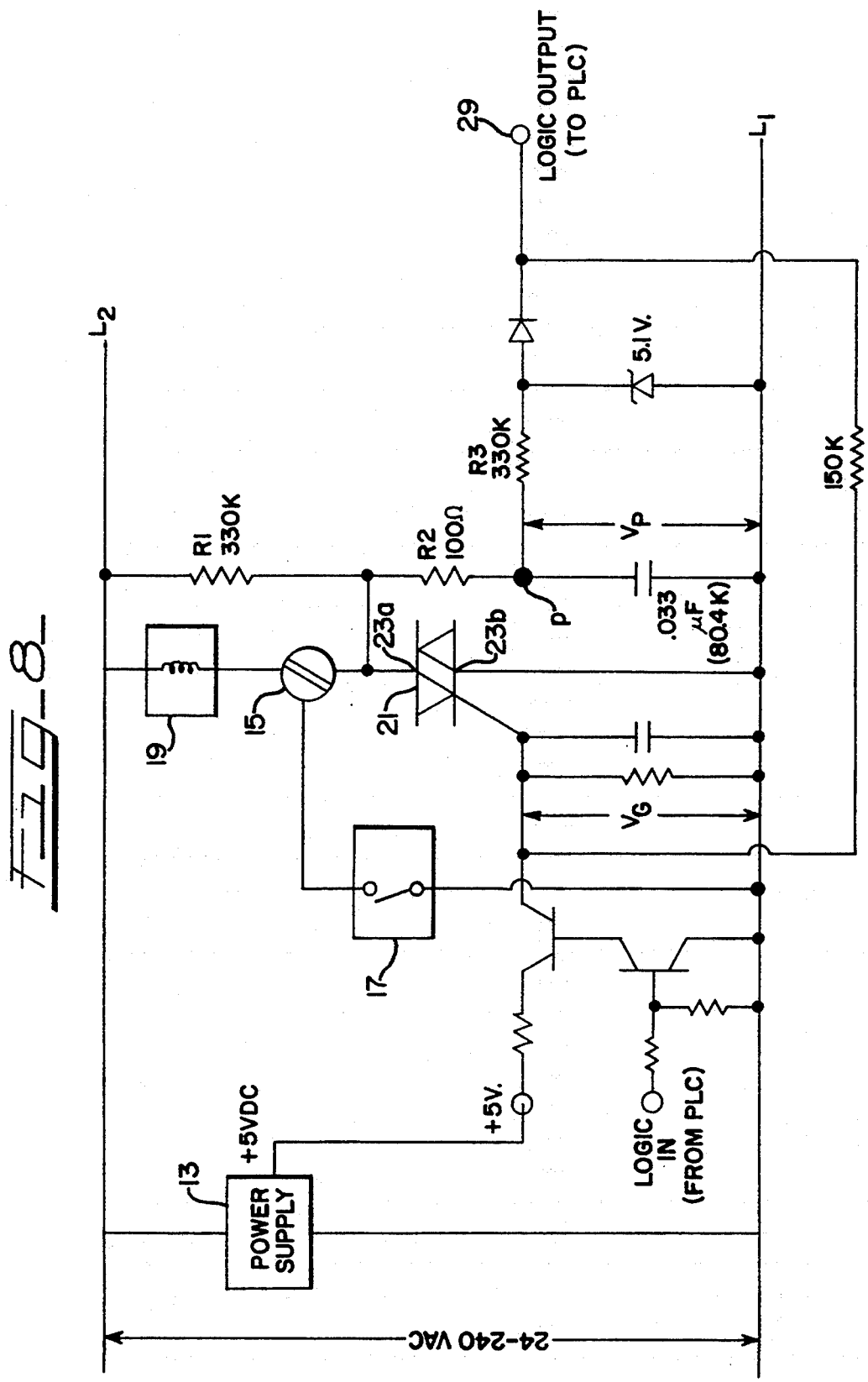

INPUT/OUTPUT MODULE HAVING A COMBINATION INPUT/OUTPUT POINT

This application is a continuation of application Ser. No. 07/931,669, filed on Aug. 19, 1992 and now abandoned, which is a continuation of application Ser. No. 07/769,513, filed on Oct. 1, 1991, now abandoned, which is a continuation of application Ser. No. 07/409,926, filed on Sep. 20, 1989 now also abandoned.

DESCRIPTION

1. Technical Field

The present invention relates to microprocessor based controllers, such as programmable logic controllers ("PLCs"), and more particularly to an input/output (or "I/O") module having a combination I/O point for use with a microprocessor based industrial controller.

2. Background Prior Art

Microprocessor based controllers, such as programmable logic controllers are becoming more and more prevalent, controlling today's modern manufacturing plants as well as relatively simple automated machines and operations.

Typically a PLC includes at least one input module having a plurality of input points and at least one output module having a plurality of output points. The PLC receives information from another device, such as a switch, via one of the input points, and the PLC transmits information, such as to a motor starter, via one of the output points. Requiring separate input modules and output modules greatly reduces the flexibility of the PLC because the user must know in advance how many input points are required and how many output points are required. In addition, because one would always require a separate input point for each input signal and a separate output point for each output signal; one point could not simultaneously be used as both an input point and an output point.

Further, it is often important to determine whether an output device (or load) is actually connected to an output device. This load detection is important both for diagnostics as well as for various PLC operations. However load detection typically has required additional circuitry which operates only when an output signal is actually applied to the load. One has not been readily able to determine prior to actuation of the output signal whether or not the load is connected to its respective output point.

Finally, an AC output point typically includes a triac which selectively provides power to its respective output device in response to an output command from the PLC. However, prior art output modules have been unable to readily detect whether the triac in fact does turn on in response to an output signal. Detection of whether a triac has actually turned on is important both for triacs in conjunction with output modules as well as for triacs in many other applications. However this too has typically required additional, external components.

The present invention is provided to solve these and other problems.

SUMMARY OF THE INVENTION

It is an object of the invention to provide a combination input/output module for a microprocessor based device, such as a programmable logic controller (or PLC)

In accordance with the invention, the combination I/O module comprises first and second lines and means for providing AC power between said first and second lines.

The combination I/O module further comprises a terminal and means adapted for coupling an input device between said terminal and said first line and means adapted for coupling an output device between said terminal and said second line.

The input device is operable between a first conductive state and a second conductive state.

The combination I/O module still further comprises means for determining the conductive state of said input device and means for selectively providing said power to said output device.

Accordingly, the combination I/O module is operable as either an input point adapted for coupling to said input device, an output point adapted for coupling to the output device, or both.

It is comprehended that the combination I/O module provides continuous sensing of the presence or absence of the output device.

It is still further comprehended that the combination I/O module includes a triac and provides for continuous sensing of the conductive state of the triac.

Other features and advantages of the invention will be apparent from the following specification taken in conjunction with the following drawing.

BRIEF DESCRIPTION OF DRAWINGS

FIG. 1 is a schematic illustration of one embodiment of the combination input/output module according to the invention;

FIG. 2 is a schematic illustration of the combination input/output module of FIG. 1, connected as an input point;

FIG. 3 is a schematic illustration of the combination input/output module of FIG. 1, connected as an output point;

FIG. 4a and b are a schematic diagram and wave form diagram, respectively, illustrating phase difference detection circuitry;

FIG. 5 is a current versus voltage curve of the triac of the combination input/output module illustrating detection of whether the triac turned on;

FIGS. 6a, b and c are ladder diagrams illustrating the combination input/output module of the present invention operative simultaneously as three inputs and one output point;

FIG. 7 illustrates a combination I/O module including a plurality of combination I/O points.

FIG. 8 is a schematic diagram illustrating an alternative embodiment of the combination input/output module of FIG. 1.

DETAILED DESCRIPTION

While this invention is susceptible of embodiments in many different forms, there is shown in the drawings and will herein be described in detail, preferred embodiments of the invention with the understanding that the present disclosure is to be considered as an exemplification of the principles of the invention and is not intended to limit the broad aspects of the invention to the embodiments illustrated.

A first embodiment of an I/O module having a combination I/O point, generally designated 11, is illustrated in FIG. 1.

A power supply 13 (with a nominal potential of 24–240 volts AC) is connected between a first line L1 and a second line L2. The particular voltage used depends upon the load, though for purposes of this discussion, 120 volts will be assumed. The power supply 13 further provides 5 volts regulated DC, the use of which is discussed below.

A terminal 15 is provided which functions as the combination I/O point. If the combination I/O module 11 is to be used as an input point, an input device 17, such as a standard mechanical switch 18, is coupled between the terminal 15 and the first line L1. If the combination I/O module 11 is to be used as an output point, an output device 19, such as a coil 20 for a motor starter (not shown), is coupled between the terminal 15 and the line L2.

In certain applications discussed below, the combination I/O module 11 is operable simultaneously as both an input point and an output point. Accordingly, the input device 17 would be coupled between the terminal 15 and the first line L1, and the output device 19 would be coupled between the terminal 15 and the second line L2.

The combination I/O module 11 further includes a triac 21, such as 2N 6073 A, having first and second power electrodes 23a, 23b, respectively, and a gate electrode 25. The triac 21 is selectively switchable between a conductive, or 'on' state and a non-conductive, or 'off' state, as is well known.

The combination I/O module 11 further includes a first resister R1 (330KΩ) coupled between the second line L2 and the terminal 15, a second resister R2 (100 KΩ) and a snubber capacitor C1 (0.033 μF) coupled in series between the terminal 15 and the first line L1. Further included is a transistor 27 having power electrodes comprising a collector 27a and an emitter 27b, and a control electrode comprising a base 27c. A third resistor R3 is coupled between the transistor base 27c and a junction P of the second resistor R2 with the first capacitor C1. A fourth resistor R4 is coupled between the first line L1 and a junction J of the third resistor R3 with the transistor base 27c. A fifth resistor R5 is coupled between the 5 volt DC output of the power supply 13 and the collector 27a of the transistor 27.

Lower values of the first resister R1 will increase power loss and reduce load detection sensitivity. Higher values of the first resister R1 reduce the base-emitter current $I_{BR}$ of the transistor 27, increasing noise sensitivity. The 0.033 μF value for the snubber capacitor C1 is based on tests with the power supply 13 at 120 VAC. Larger capacitance may be necessary for larger voltages.

The junction of the fifth resistor R5 with the collector 27a of the transistor 27 provides a logic output 29 which is utilized by the PLC, as is well known. As discussed below, the value of the logic output 29 indicates the status of the input device 17.

Referring to FIG. 2, operation of the combination I/O module 11 as an input point is illustrated. The reference numerals relate to those elements discussed above with respect to FIG. 1

When the input device 17, such as the switch 18, is open, the voltage at the terminal 15 is determined by the voltage divider R1, R2, C1 (assuming the triac 21 is off). A current divider network comprising the third and fourth resistors R3 and R4 biases the transistor 27 on during positive line cycles. With the transistor 27 turned on, the voltage at the logic output 29 is logic low during positive half cycles. Thus, an open input device 17 results in a zero logic state output at the logic output 29 during positive half cycles.

When the input device 17 is closed, the voltage at the terminal 15 is shorted to ground, thus biasing the transistor 27 off for both positive and negative cycles. With the transistor 27 off, the voltage at the logic output 29 is held at the 5 volt DC supply voltage. Thus a closed input device 17 results in a 5 volt, or one logic state output at the logic output 29 for both positive and negative cycles.

The combination I/O module 11 utilized as an output point as illustrated in FIG. 3. As with FIG. 2, common reference numerals have been maintained in FIG. 3.

To operate the combination I/O module 11 as an output point, the output device 19 is coupled between the terminal 15 and the second line L2. When the output device 19 is to be activated, the triac 21 receives a positive, logic on signal from the PLC (not shown) at the gate electrode 25 of the triac 21. The logic on signal turns on the triac 21, thus placing the output device 19 between the first and second lines L1, L2. Similarly, when the output device 19 is to be turned off, the triac 21 receives a logic off signal from the PLC, turning off the triac 21 at the next current zero crossing, and thereby isolating the output device 19 from the first line L1. Since the triac 21 acts the same as the switch 18, the condition of the triac 21 can be monitored by the transistor circuit to determine if it is following its logic signals.

The combination I/O module 11 is further provided with load detection circuitry to detect the presence (or absence) of the output device 19 coupled between the second line L2 and the terminal 15 as well as circuitry to determine whether the triac 21 indeed turned on in response to a logic on signal from the PLC.

The following discussion describes how the load 19 is detected with both the triac 21 and the switch 17 'off'.

Typically, the impedance of the output device 19 is significantly lower than the impedance of the 330kΩ first resistor R1. Referring still to FIG. 3, and assuming for the moment that the output device 19 is not coupled between the terminal 15 and the second line L2, the phase of the voltage ($V_p$) at the point P relative to the first line $L_1$ will lag the phase of the voltage ($V_{L2}$) of the second line L2 relative to the first line L1 because of the capacitance of the snubber capacitor C1. Because the impedance of the output device 19 is less than the impedance of the first resistor R1, when the output device 19 is coupled between the second line L2 and the terminal 15, the resistance of the first resistor R1 is effectively substantially reduced (in fact, R1 typically can be ignored).

In the limit, for example if the resistance of the output device 19 is 0Ω, the voltage $V_p$ would be in phase with the voltage $V_{L2}$. In reality, because the output device 19 does have some impedance, the voltages $V_p$ and $V_{L2}$ will not be completely in phase; however, their phases will be much closer than with no output device 19. Thus, by monitoring the phase relationship of the voltage $V_p$ relative to the voltage $V_{L2}$ one can constantly monitor the presence, of absence, or the output device 19.

A circuit for determining the phase difference between voltages $V_p$ and $V_{L2}$, and hence the presence of absence of the output device 19, is illustrated FIGS. 4a and b.

A reference circuit 33 provides a square wave output $V_{ref}$ representing the voltage of an I/O point without a load connected. The reference circuit 33 is the same as the combination I/O module 11, but it does not have the terminal 15. A first wave form 36 representing the phase of the voltage of the second line L2 with respect to the voltage of the first line L1 is for reference only.

A second wave form 37 representing the phase of the voltage $V_{ref}$ relative to the voltage on the first line L1 is generated at the collector of the transistor 27 of the reference circuit 33.

A third wave form 40 representing the phase of the voltage at the logic output 29 of the combination I/O module 11 with and without a load connected demonstrates the effect of the load on the phase of the voltage. As illustrated, the load wave form is shifted by an amount delta tL.

One way of detecting this phase delay is by sampling both the second and the third wave forms 37, 40, respectively, and passing the sampled data through a respective register of the PLC as a software oscilloscope of the wave forms 37, 40. By comparing these two registers, the PLC can determine the phase difference and, hence, the presence or absence of the output device 19. The particular sampling rate necessary depends on the impedance of the components as well as of the output device 19, as such relative values determine the total phase difference between load and no-load conditions. In addition, by memorizing the phase shift for a given load when the triac 21 is off, one can detect changes in load characteristics such as the beginning failure of a motor starter coil.

The above discussion permits the combination I/O module 11 to detect the presence or absence of a load when the triac 21 is off. Detection of the presence or absence of a load when the triac 21 is on is illustrated in FIG. 5.

FIG. 5 illustrates the relationship between the load current through the triac 21, $I_{LF}$ versus the gate voltage $V_G$ for the triac 21. An "ideal" curve is illustrated in phantom while an actual curve is illustrated in solid.

According to the ideal curve, there is a first gate voltage $V_G1$ for all load currents greater than the gate current $I_G$ and a second gate voltage $V_G2$ for all load currents less than the gate current $I_g$. As illustrated however in the actual curve, there is a rounding of the curve about the gate current value in a progressive decline in the gate voltage with increased negative load current. The actual curve for a given triac is independent of the actual impedance of the load. In order to detect whether the triac 21 is actually conducting load current, one can detect the shift in the level of $V_G$ between positive and negative current. In the event that the gate voltage $V_G$ does not change, one knows that the triac 21 is not conducting.

Referring again to FIG. 1, one application of the combination I/O module 11 illustrates how it can be used to permit a mechanical input, such as the switch 18, to operate both a direct output as well as a software input. The input device 17 is coupled between the first line L1 and the terminal 15 and the output device 19 on which one desires to perform the direct output, for example to turn on an indicator light, is coupled between the terminal 15 and the second line L2 when the switch 18 is closed, the indicator light is coupled directly between L1 and L2, bypassing the triac 21. In addition the logic output 29 goes from logic state zero to one on positive half cycles. Thus one can have a positive indication of the status of the switch 18 as well as a software indication thereof.

The combination I/O module 11 can also be used to replace a motor starter circuit which previously would have required three inputs and one output, as illustrated in FIGS. 6a, b and c. A traditional motor starter circuit is illustrated FIG. 6a. The circuit includes a starter switch 51, a stop switch 53, various limit and emergency stop switches generally designated 55, a starter coil $C_s$ and a starter relay $R_s$. As is well known, when the starter switch 51 is closed, assuming the switches 53 and 55 are also closed, current from lines L1 to L2 energizes the starter coil $C_s$, closing the starter relay $R_s$, bypassing the starter switch 51. As long as the stop switch 53 and the emergency/limit switches 55 remain closed, the starter coil $C_s$ will remain energized and the starter relay $R_s$ will stay closed, thereby providing continuous power to the motor. Typically to automate this function, a minimum of 4 points; three inputs and one output would be required. The three inputs would be from the starter switch 51, the stop switch 53 and the emergency/limit switches 55; and the output would be to the motor (not shown).

As illustrated in FIG. 6b, a motor starter circuit utilizing the combination I/O module 11 of the present invention can be performed using a single point. Accordingly, the starter switch 51 is wired between the first line L1 and the terminal 15; the stop switch 53, the emergency/limit switches 55 and the motor are wired in series between the terminal 15 and the second line L2. The triac 21 is illustrated in phantom as extending between L1 and 15 (See FIGS. 1-3).

Software which would be resident in the PLC, to perform the above is illustrated in FIG. 6c in ladder diagram form. A rung 61 includes a first relay 63 which is normally open, until continuity between L1 and the terminal 15 is established. The rung 61 further includes a second relay 65 which is open until continuity between the terminal 15 and the second line L2 is detected. A coil 66 represents the status of conduction of the triac 21. Parallel to the first relay 63 is a third relay 67 which is closed upon energization of the coil 66.

Accordingly, when the starter switch 51 closes, the module 11 detects continuity between the first line L1 and the terminal 15. One then measures continuity between the terminal 15 and the second line L2 as discussed above with respect to determining the presence of a load. If continuity is detected between the terminal 15 and the second line L2, this energizes the continuity coil 66, thereby closing the relay 67. The relay 67 will remain closed until continuity between terminal 15 and the second line L2 terminates, such as actuation of the stop switch 53 or the emergency/limit switch 55.

Typically, an input or output module contains more than one point. Accordingly, in the preferred embodiment, the module 11 actually contains 16 points, each of which is operable as an input point, an output point, or both, as illustrated in FIG. 7. The logic outputs 29 of the first eight I/O points are coupled via a first multiplexor 71 (LS-244) to a data bus 73. Similarly, the 9th through 16th I/O points are coupled via a second multiplexor 77 (LS-244) to the data bus 73. The output of the reference circuit 33 is connected to an interrupt pin of a PLC, allowing phase detection of the other I/O points.

An alternate embodiment of the invention is illustrated in FIG. 8. Common reference numerals have been maintained. As with the first embodiment, the input device 17 is coupled between the terminal 15 and the first line L1, and the output device 19 is coupled between the terminal 15 and the second line L2. The logic in signal from the PLC turns on the triac 21 providing power to the output device 19. Further, when the input device 17 is open, the voltage at the logic output 29 is zero, and when the input device 17 is closed the voltage at the logic output 29 is 5.1 volts, a logical 1. As also with the first embodiment, in the second embodiment, the presence or absence of the load 19 when the triac 21 is off is detected by monitoring the phase difference between the phase of the voltage of the second line L2 relative to the first line L1 and the phase of the voltage at point P relative to the first line L1. Further, detection of operation of triac current is performed by monitoring changes in the gate voltage $V_G$.

Although explained with respect to an I/O module, it should be understood that the technique for detecting whether a triac is conducting current by monitoring its gate voltage is equally applicable to any device utilizing a triac, and this aspect of the invention should be accordingly interpreted.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. An input/output (I/O) module having a combination I/O point for use with a microprocessor based industrial programmable controller, the I/O module circuitry comprising:
   a) first and second power lines;
   b) means for providing AC power across said first and second lines;
   c) a terminal means electrically connected between said first and second lines for serving as the combination I/O point, said terminal means providing an electrical common point for connection to both an input device and an output device connected in series across said first and second lines, respectively, at the same time, and said terminal means selectively operable either as an input point or an output point, or both, said predetermined operable status of said terminal means being operatively independent from said microprocessor of the industrial programmable controller;
   d) first circuit means for coupling the input device between said terminal means and said first line, said input device operable between a non-conductive state as an open switch and a conductive state as a closed switch;
   e) logic output means, responsive to the non-conductive and conductive states of said input device, for generating a logic output signal representative of the non-conductive and conductive states of the input device, said logic output means having said output signal coupled to said microprocessor of the industrial programmable controller;
   f) second circuit means for coupling the output device between said terminal means and said second line;
   g) third circuit means for selectively controlling said AC power applied to said output device, through either the input device or through a control signal from said microprocessor of the industrial programmable controller in which said control signal is fed back to said logic output means;
   h) said logic output means further including means for sensing the simultaneously coupling in series of both said input and output devices between said first and second lines, respectively, with said terminal means, connected as the common point between said I/O devices, said further sensing means for allowing operation of said input device in said conductive state as a momentary switch closure and said output device controlled by said microprocessor of the industrial programmable controller from said terminal means in response to said momentary switch closure after said input device returns to said non-conductive state; and
   i) wherein said input device and said output device are both operative and sensed when connected to said terminal means at the same time whether or not the microprocessor of the industrial programmable controller is sensing the logic output signal or providing the control signal to switch on the output device.

2. An input/output (I/O) module having a combination I/O point for use with a microprocessor based device, the I/O module circuitry comprising:
   a) a first power line;
   b) a second power line;
   c) means for providing AC power between said first and said second power lines;
   d) a terminal means for serving as the combination I/O point, said terminal means operable as an input point or an output point or both while being independent from control by said microprocessor based device;
   e) a triac connected between said terminal means and said first power line, said triac selectively gated between a conductive state and a non-conductive state;
   f) an input device connected between said terminal means and said first line, said input device operable between a non-conductive state as an open switch and a conductive state as a closed switch;
   g) logic output means connected to said terminal means for determining the conductive state of said input device, said logic output means including further means for generating a logic output signal representative of said conductive state of said input device to said microprocessor based device;
   h) an output device connected between said terminal means and said second power line;
   i) means responsive to said logic output signal and connected to said microprocessor based device for selectively generating a gate signal to switch said triac from said non-conductive state to said conductive state when said input device operates in said conductive state, thereby providing said AC power to said output device;
   j) said terminal means providing a common electrical point between said input and output devices connected in series across said first and second lines, respectively, said input device operative in said conductive state as a momentary switch closure to apply AC power across said output device, said output device controlled by said microprocessor based device through said triac gate signal and through said terminal means in response to said momentary switch closure after said input device returns to said non-conductive state; and k) wherein said input and output devices are both operatively connected to said terminal means at the same time independent of said microprocessor based device first predetermining whether said terminal means is operable as either an input point or an output point, or both.

3. The combination input/output module of claim 2 including means for determining a presence or absence of said output device regardless of the conductive state of said triac.

4. The combination input/output module of claim 3 wherein said logic output signal is a rectangular waveform when said input device is operable as an open switch or not coupled to said terminal means.

5. The combination input/output module of claim 4 wherein said determining means of presence of said output device includes a reference circuit for generating a reference signal representative of a phase relationship between said second power line and said logic output, said reference signal representing a logic output signal of said logic terminal when said output device is not coupled to said terminal means.

6. The combination input/output module of claim 5 wherein said determining means of presence of said output device includes means for comparing a phase relationship of said reference signal with said logic output signal, said phase relationship having a first phase relationship if said output device is present and a second phase relationship if said output device is absent.

7. The combination input/output module of claim 6 wherein said determining means of said presence of said output device further includes means for comparing said phase relationship of said reference signal with said logic output signal from an initial setting for a given output device with subsequent comparisons, said means for determining changes in load characteristics as said output device ages from use.

8. The combination input/output module of claim 2 including means for determining said conductive state of said triac.

9. The combination input/output module of claim 8 wherein said determining means of said conductive state of said triac includes means for monitoring gate voltage of said triac, said means for detecting changes in said gate voltage, said gate voltage having a first gate voltage for all load currents greater than a gate current of said triac and a second gate voltage for all load currents less than said gate current of said triac.

10. The combination input/output module of claim 9 wherein said gate voltage of said triac progressively declines with increased negative load current, and wherein said detecting means detects changes in said gate voltage during an interval when said triac is switching from conducting between positive and negative load current.

11. The combination input/output module of claim 10 wherein said detecting means of changes in said gate voltage during said interval when said triac is switching from conducting between positive and negative load current determines that said triac is not conducting if no change is detected.

* * * * *